US011887564B2

(12) United States Patent
Lu

(10) Patent No.: US 11,887,564 B2
(45) Date of Patent: Jan. 30, 2024

(54) RESONANCE COUNTERWEIGHT STRUCTURE FOR AUDIO EFFECT ARTICLE

(71) Applicant: Hsin-Jung Lu, New Taipei (TW)

(72) Inventor: Hsin-Jung Lu, New Taipei (TW)

( * ) Notice: Subject to any disclaimer, the term of this patent is extended or adjusted under 35 U.S.C. 154(b) by 28 days.

(21) Appl. No.: 17/552,642

(22) Filed: Dec. 16, 2021

(65) Prior Publication Data

US 2022/0246117 A1 Aug. 4, 2022

(30) Foreign Application Priority Data

Feb. 1, 2021 (TW) ................................ 110201231

(51) Int. Cl.
*G10D 9/00* (2020.01)

(52) U.S. Cl.
CPC .................................... *G10D 9/00* (2013.01)

(58) Field of Classification Search
CPC ............... G10D 9/00; G10D 7/08; G10D 3/00
See application file for complete search history.

(56) References Cited

FOREIGN PATENT DOCUMENTS

KR 880000806 Y1 * 12/1981 ............... G11B 3/14

* cited by examiner

*Primary Examiner* — Kimberly R Lockett
(74) *Attorney, Agent, or Firm* — Rosenberg, Klein & Lee

(57) ABSTRACT

A resonance counterweight structure for audio effect article includes a hollow counterweight main body and an assembling section connected with the counterweight main body. The assembling section can be mounted in a predetermined position of a musical instrument. The counterweight main body at least includes an upper wall, a lower wall and a peripheral wall connected between the upper and lower walls. The upper wall, the lower wall and the peripheral wall define a chamber of the counterweight main body. At least one counterweight fine-adjustment unit is received in the chamber. The counterweight main body and the counterweight fine-adjustment unit help the audio effect article to modify the music so as to achieve more idealistic timbre effect. A player can more diversely select or replace the counterweight structure, whereby one single musical instrument can selectively output different timbre effects according to the requirements of different playing situations.

18 Claims, 5 Drawing Sheets

RESONANCE COUNTERWEIGHT STRUCTURE FOR AUDIO EFFECT ARTICLE

BACKGROUND OF THE INVENTION

1. Field of the Invention

The present invention relates generally to a resonance counterweight structure for audio effect article, and more particularly to a resonance counterweight structure mounted on a musical instrument to help the audio effect article in producing more idealistic timbre effect.

2. Description of the Related Art

A conventional sonic wave intensification feedback disc, resonance amplified or the like is mounted on an audio effect article or system such as a string instrument, a wind instrument, an audio device, a loudspeaker, etc. to help the audio effect article in producing sound vibration or resonance. For example, Taiwanese Patent No. 108127131 "support rod of string instrument" discloses a typical embodiment. In this embodiment, a sonic wave intensification feedback disc is assembled with the support rod on the bottom section of the audio effect article so as to improve the resonance effect of the loudspeaker and enhance the output timbre and volume.

Also, a conventional resonance counterweight screw (such as Japanese Yanagisawa Yany BooStar resonance counterweight screw) can be used in cooperation with (or instead of) the mouthpiece securing rotary button of a conventional saxophone (or the like musical instrument) for a player to mount or securely assemble and lock the mouthpiece with the saxophone (or the like musical instrument). Accordingly, when an airflow passes through the mouthpiece, a specific oscillation resonance and vibration effect is produced to specially modify the timbre and resonance output from the musical instrument and reduce dependence of a player on playing skill. In this case, the player can more easily manage and control playing effect.

With respect to the structure and application of the conventional resonance counterweight screw, the conventional resonance counterweight screw is generally made of a specific material and has a fixed mass so that the conventional resonance counterweight screw cannot provide different sustaining extents of oscillation resonance effect for different playing contents. That is, the mass of the conventional resonance counterweight screw itself cannot be adjusted or changed. As a result, with respect to some players, (especially an amateur, a learner, etc.) or some different playing environments and playing situations, it is critical whether the resonance counterweight screw can be selected or regulated so as to more solidify the timbre and make the timbre more saturated and smoother. This will affect the performance effect of the player.

To speak representatively, it is revealed from the above references that the conventional resonance counterweight device for the audio effect article has some shortcomings in structure, application and design. Also, it is reflected from the above references that the conventional resonance amplified or resonance counterweight device has some problems in practical use. The structure of the resonance counterweight device can be redesigned to be different from the conventional structure so as to change use and operation effect thereof. For example, a system can be provided to enable a player to select or replace the resonance counterweight device with different masses so as to substantially achieve more idealistic timbre output effect and change combination effect.

All the above issues are not taught or substantially disclosed in the above references.

SUMMARY OF THE INVENTION

It is therefore a primary object of the present invention to provide a resonance counterweight structure for audio effect article includes a hollow counterweight main body and an assembling section connected with the counterweight main body. The assembling section can be mounted in a predetermined position of the audio effect article. The counterweight main body at least includes an upper wall, a lower wall and a peripheral wall connected between the upper and lower walls. The upper wall, the lower wall and the peripheral wall together define a chamber of the counterweight main body. At least one counterweight fine-adjustment unit is received in the chamber. In operation, the counterweight main body and the counterweight fine-adjustment unit together help the audio effect article to achieve resonance sustaining effect of harmonic fadeout so as to modify the non-uniform and unsmooth parts in the music and achieve more idealistic (and/or saturated) timbre effect. In addition, the arrangement of the chamber of the counterweight main body and the counterweight fine-adjustment units disposed in the chamber enable a player to select or replace the counterweight with different masses in accordance with the requirements. Therefore, the audio effect article can change and output different timbre effects. This improves the shortcoming of the conventional resonance counterweight screw that the screw cannot be selected or replaced to affect the operation and effect of the audio effect article.

In the above resonance counterweight structure for audio effect article, the peripheral wall of the counterweight main body is formed with multiple protruding sharp teeth arranged in adjacency to each other. The sharp teeth extend in a direction in parallel to an axis of the counterweight main body. The sharp teeth provide an operation system for a player to (rotate) and lock the assembling section of the counterweight main body onto the audio effect article. In addition, the tooth peak height (or protruding height) of at least some sharp teeth of the counterweight main body are different from (smaller or larger than) the tooth peak height (or protruding height) of the other sharp teeth of the counterweight main body. Alternatively, all the sharp teeth are respectively formed with different tooth peak heights so as to achieve more diverse and sophisticated audio and sustaining effect. This relatively changes the entire timbre effect output from the audio effect article.

The present invention can be best understood through the following description and accompanying drawings, wherein:

DETAILED DESCRIPTION OF THE PREFERRED EMBODIMENTS

Figure 1:
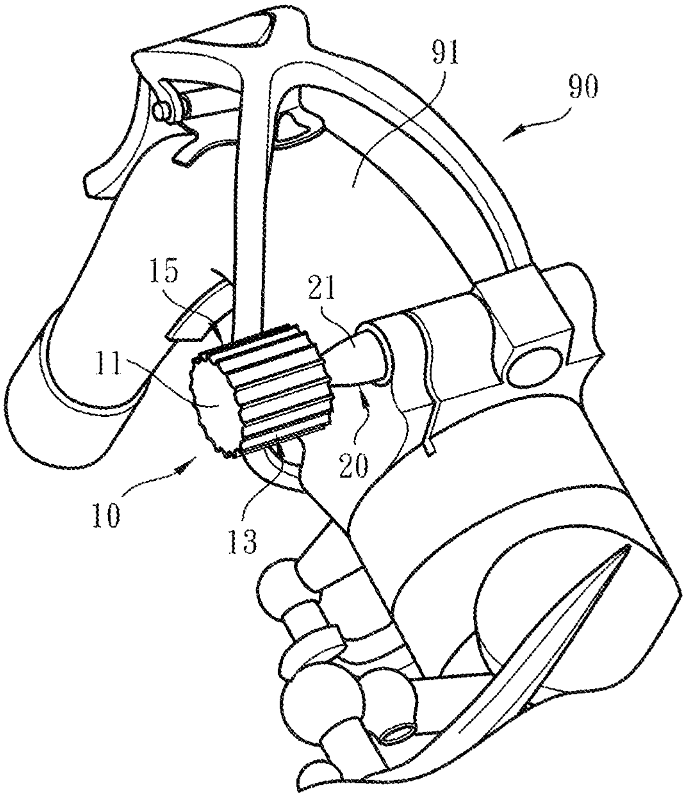
FIG. 1 is a perspective view showing that the resonance counterweight structure of the present invention is assembled on an audio effect article and the counterweight main body or the assembling section of the resonance counterweight structure locks a mouthpiece with the audio effect article.
Figure 2:
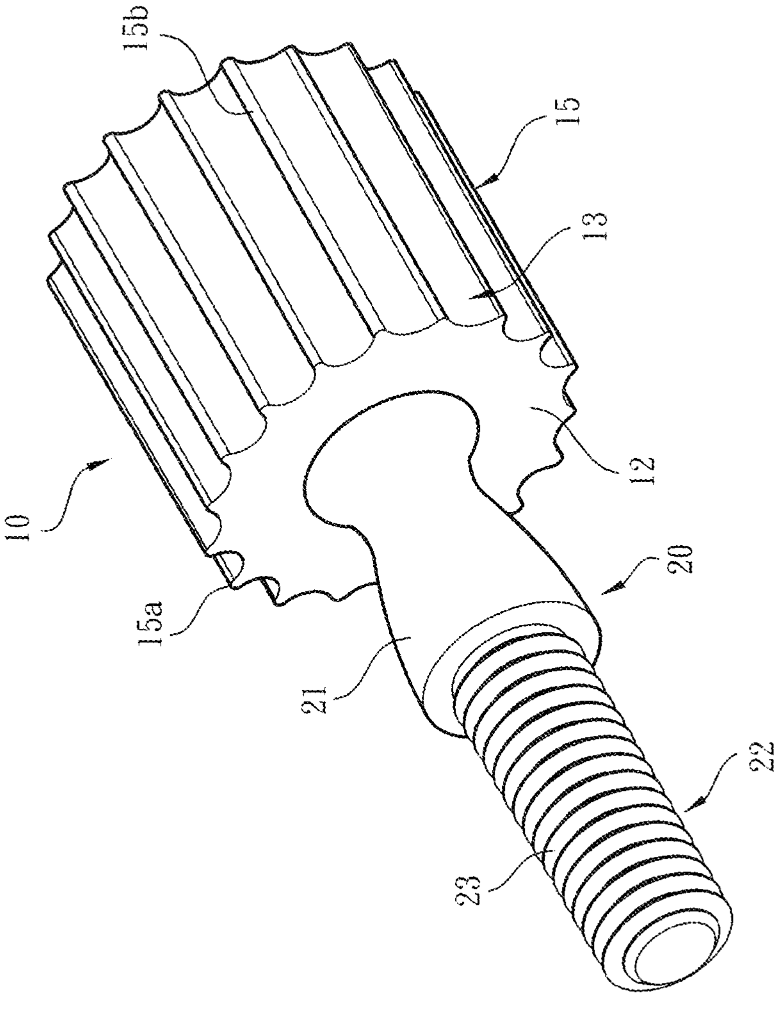
FIG. 2 is a perspective view of the resonance counterweight structure of the present invention.
Figure 3:
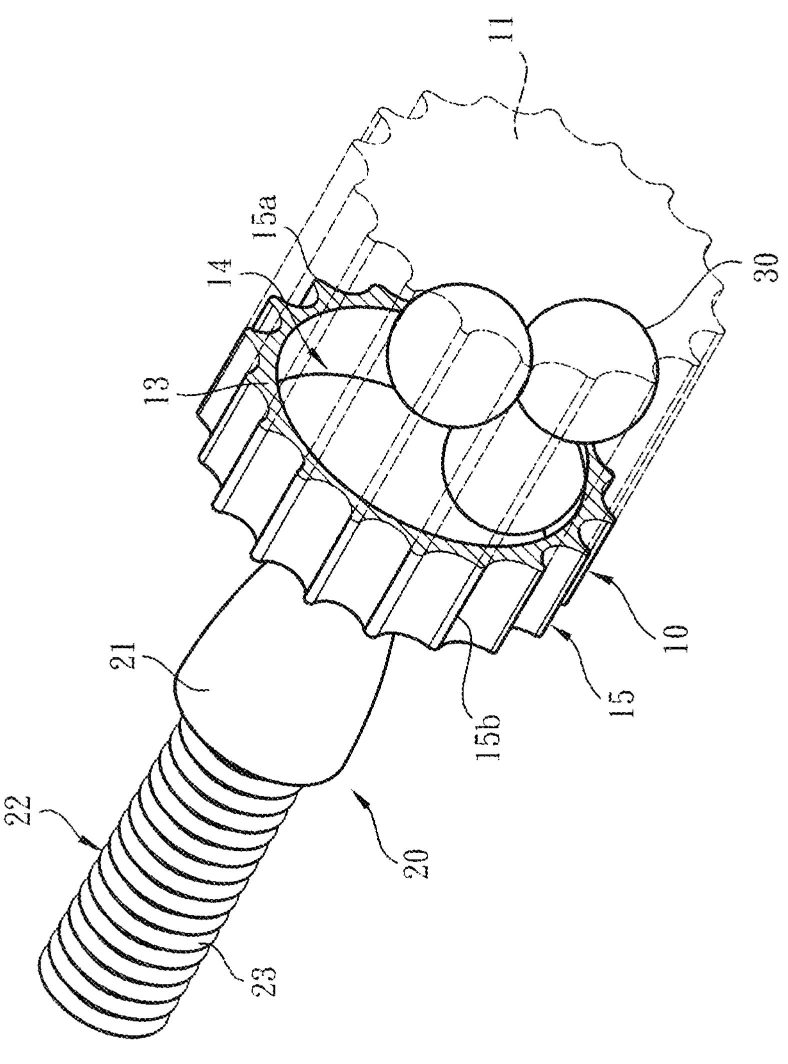
FIG. 3 is a perspective view of the resonance counterweight structure of the present invention, showing that the counterweight fine-adjustment units are received in the chamber of the counterweight main body.

Please refer to FIGS. 1, 2 and 3. The resonance counterweight structure for audio effect article of the present invention includes a hollow counterweight main body 10 and an assembling section 20 connected with the counterweight main body 10. The assembling section 20 can be assembled or secured to a predetermined position of an audio effect article 90. In a preferred embodiment, a saxophone (or the like audio effect article) is selected for illustration purposes. The predetermined position means a position where the assembling section 20 (or the counterweight main body 10) is assembled with a mouthpiece 91. Alternatively, the assembling section 20 (or the counterweight main body 10) is used to securely assemble the mouthpiece 91 with the audio effect article 90 (resonance tube) to cooperatively form a mouthpiece securing rotary button structure.

As shown in the drawings, the counterweight main body 10 at least includes an upper wall 11, a lower wall 12 and a peripheral wall 13 connected between the upper and lower walls 11, 12. The upper wall 11, the lower wall 12 and the peripheral wall 13 together define a chamber 14 of the counterweight main body 10. The assembling section 20 is connected with the lower wall 12 of the counterweight main body 10. The assembling section 20 has the form of a rod body structure including a base portion 21 and an extension portion 22 connected with the base portion 21.

In a preferred embodiment, the extension portion 22 of the assembling section 20 is formed with a thread 23 for the assembling section 20 to securely lock the mouthpiece 91 with the audio effect article 90 (resonance tube).

FIG. 3 especially shows that at least one counterweight fine-adjustment unit 30 is received in the chamber 14 of the counterweight main body 10. The counterweight fine-adjustment unit 30 serves to cooperate with the sound of the audio effect article 90 to provide delayed resonance (or so-called sustaining) effect so as to help in modifying the audio effect article 90 to produce more idealistic or saturated and smooth timbre. In accordance with the requirements, a player can select or replace the counterweight fine-adjustment unit 30 so as to change the mass of the counterweight main body 10, whereby the audio effect article 90 can output different timbres and achieve a modifying effect. This improves the shortcoming of the conventional structure that the mass of the resonance counterweight screw cannot be selected or replaced to affect the flexibility of application.

That is, the chamber 14 of the counterweight main body 10 can be fully hollow or a different number of counterweight fine-adjustment units 30 or different weight/volume of counterweight fine-adjustment unit 30 can be further placed into the chamber 14 so as to change the total mass of the counterweight main body 10 for providing delayed resonance effect in accordance with different players, different environments or physiological states.

It should be noted that the counterweight main body 10 has a chamber 14. Such structural form makes the counterweight main body 10 also serve as a speaker. When an airflow passes through the mouthpiece 91 to produce vibration effect, the counterweight main body 10 is also driven to produce a specific delayed vibration resonance (or sustaining) effect posterior to the fundamental frequency of the audio effect article itself. The specific sustaining effect means that the different mass of the counterweight main body 10 or the different number of counterweight fine-adjustment units 30 or different weight/volume of counterweight fine-adjustment unit 30 relatively achieve oscillation resonance effect to different sustaining extents.

Figure 4:
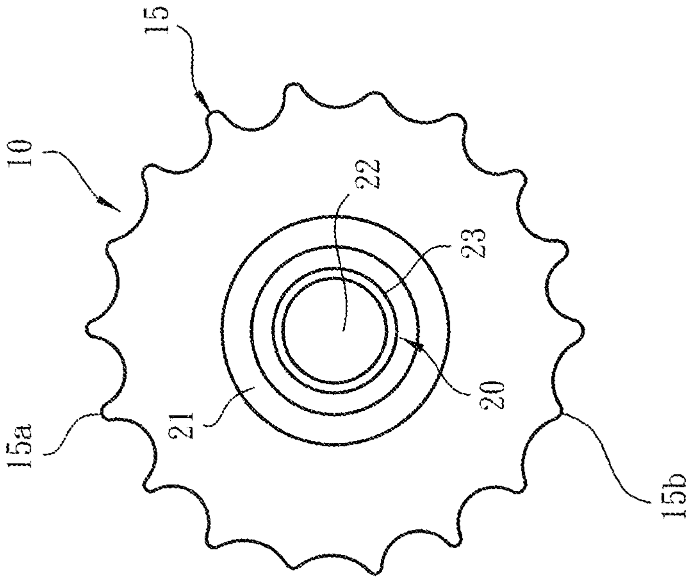
FIG. 4 is a plane view of the resonance counterweight structure of the present invention, seen from one end of the assembling section and showing the arrangement of the sharp teeth of the counterweight main body.

Please refer to FIG. 4. In a preferred embodiment, the peripheral wall 13 of the counterweight main body 10 is formed with multiple protruding sharp teeth 15 arranged in adjacency to each other. The sharp teeth 15 extend in a direction in parallel to an axis of the counterweight main body 10. The sharp teeth 15 provide a push operation (or frictional) system for a player to (rotate) and lock the assembling section 20 onto the audio effect article 90. In addition, the tooth peak height (or protruding height) of at least some sharp teeth (denoted with reference numeral 15*a*) of the counterweight main body 10 are different from (smaller or larger than) the tooth peak height (or protruding height) of the other sharp teeth (denoted with reference numeral 15*b*) of the counterweight main body 10. Alternatively, all the sharp teeth 15 (or some sharp teeth 15*a*) are respectively formed with different tooth peak heights. The structural form of the sharp teeth 15 will change the mass of the counterweight main body 10 so as to achieve different delayed resonance audio effects. Moreover, the form and number of the chamber 14 and the counterweight fine-adjustment units 30 and the form and number of the sharp teeth 15 as well as the height of the tooth peaks can be selectively combined or designed so as to diversely change the timbre effect output from the audio effect article 90 (resonance tube).

Figure 5:
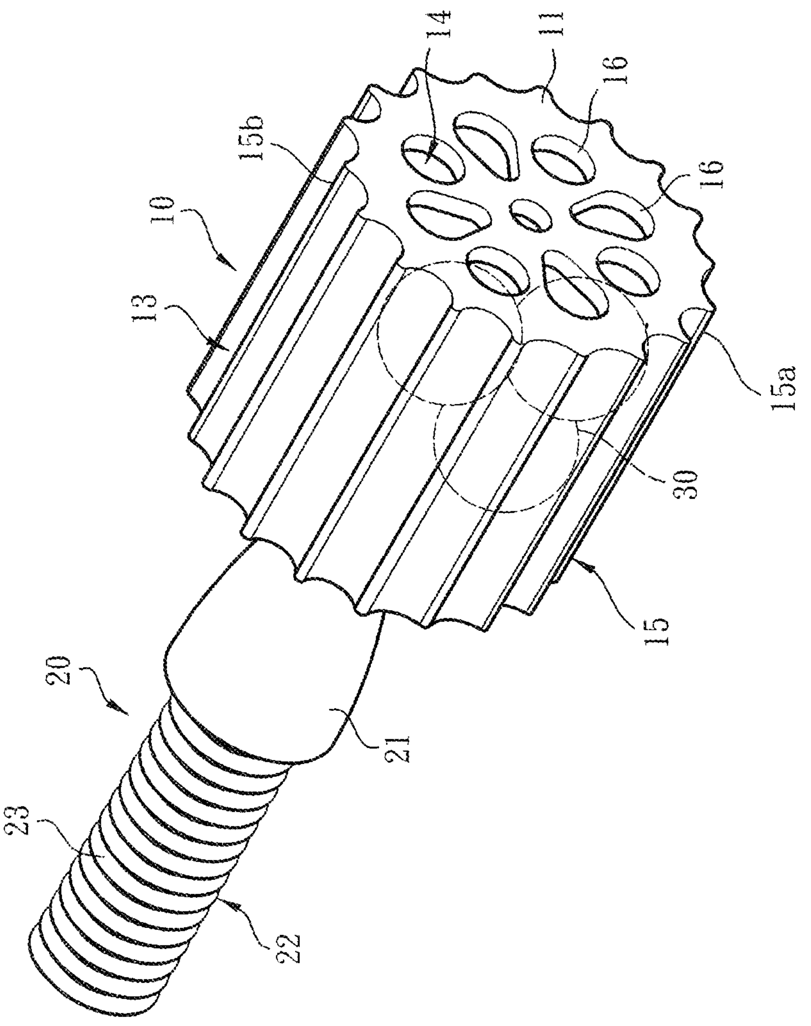
FIG. 5 is a perspective view of a modified embodiment of the resonance counterweight structure of the present invention, showing that the upper wall of the counterweight main body is formed with multiple perforations and the counterweight fine-adjustment units are received in the chamber of the counterweight main body.

Please refer to FIG. 5, which shows a modified embodiment of the present invention. In this embodiment, the upper wall 11 of the counterweight main body 10 is formed with multiple perforations 16 and the counterweight main body 10 is formed a chamber 14 for receiving the counterweight fine-adjustment units 30. The perforations 16 have geometrical configurations. The perforations 16 are for an operator to check the number or volume of the counterweight fine-adjustment units 30. Also, the perforations 16 can have identical (or different) geometrical configurations/areas so as to change the mass of the counterweight main body 10 and the output resonance audio effect. In addition, the counterweight main body 10 has the perforations 16 so that the chamber 14 is in communication with the outer side. Such structural form relatively changes the vibration resonance effect of the counterweight main body 10 (and/or the counterweight fine-adjustment units 30).

To speak representatively, in comparison with the conventional structure, the resonance counterweight structure for audio effect article of the present invention has the following advantages:

1. The resonance counterweight structure composed of the hollow counterweight main body 10 and the assembling section 20 has been redesigned. For example, the counterweight main body 10 is formed with a chamber 14 for receiving the same (or different) number or weight/volume of counterweight fine-adjustment units

30. The peripheral wall 13 of the counterweight main body 10 is formed with multiple sharp teeth 15. The sharp teeth 15 are formed with the same or different tooth peak heights. Alternatively, the upper wall 11 of the counterweight main body 10 is formed with multiple perforations 16. The perforations 16 have identical or different geometrical configurations or areas. The structural form of the present invention is obviously different from the conventional structural form so that the use and operation form of the conventional structure are changed.

2. Especially, in the condition that the operation is simplified, the resonance counterweight structure provides a system, in which the mass of the counterweight main body 10 can be selectively replaced in accordance with different players or different environment requirements. Substantially, the resonance counterweight structure also achieves a more idealistic timbre output effect and diversified change combination effect.

In conclusion, the resonance counterweight structure for audio effect article of the present invention is effective and different from the conventional structure in space form. The resonance counterweight structure for audio effect article of the present invention is advantageous over the conventional structure, greatly advanced and patentable.

The above embodiments are only used to illustrate the present invention, not intended to limit the scope thereof. Many modifications of the above embodiments can be made without departing from the spirit of the present invention.

What is claimed is:

1. A resonance counterweight structure for audio effect article, comprising a hollow counterweight main body 10 and an assembling section 20 connected with the counterweight main body 10, the assembling section 20 being mountable in a predetermined position of an audio effect article 90, the counterweight main body 10 at least including an upper wall 11, a lower wall 12 and a peripheral wall 13 connected between the upper and lower walls 11, 12, the upper wall 11 of the counterweight main body 10 is formed with multiple perforations 16, the geometrical configurations of the perforations 16 being at least one of that the geometrical configurations are identical to each other and the geometrical configurations are different from each other, the upper wall 11, the lower wall 12 and the peripheral wall 13 together defining a chamber 14 of the counterweight main body 10.

2. The resonance counterweight structure for audio effect article as claimed in claim 1, wherein at least one counterweight fine-adjustment unit 30 is received in the chamber 14.

3. The resonance counterweight structure for audio effect article as claimed in claim 1, wherein the predetermined position means a position where the assembling section 20 is assembled with a mouthpiece 91 of the audio effect article 90, the assembling section 20 being connected with the lower wall 12 of the counterweight main body 10, the assembling section 20 having the form of a rod body structure including a base portion 21 and an extension portion 22 connected with the base portion 21, the extension portion 22 of the assembling section 20 being formed with a thread 23.

4. The resonance counterweight structure for audio effect article as claimed in claim 2, wherein the predetermined position means a position where the assembling section 20 is assembled with a mouthpiece 91 of the audio effect article 90, the assembling section 20 being connected with the lower wall 12 of the counterweight main body 10, the assembling section 20 having the form of a rod body structure including a base portion 21 and an extension portion 22 connected with the base portion 21, the extension portion 22 of the assembling section 20 being formed with a thread 23.

5. The resonance counterweight structure for audio effect article as claimed in claim 1, wherein the peripheral wall 13 of the counterweight main body 10 is formed with multiple protruding sharp teeth 15 arranged in adjacency to each other, the sharp teeth 15 extending in a direction in parallel to an axis of the counterweight main body 10, the tooth peak height of at least some sharp teeth 15*a* of the counterweight main body 10 being different from the tooth peak height of the other sharp teeth 15*b* of the counterweight main body 10.

6. The resonance counterweight structure for audio effect article as claimed in claim 2, wherein the peripheral wall 13 of the counterweight main body 10 is formed with multiple protruding sharp teeth 15 arranged in adjacency to each other, the sharp teeth 15 extending in a direction in parallel to an axis of the counterweight main body 10, the tooth peak height of at least some sharp teeth 15*a* of the counterweight main body 10 being different from the tooth peak height of the other sharp teeth 15*b* of the counterweight main body 10.

7. The resonance counterweight structure for audio effect article as claimed in claim 3, wherein the peripheral wall 13 of the counterweight main body 10 is formed with multiple protruding sharp teeth 15 arranged in adjacency to each other, the sharp teeth 15 extending in a direction in parallel to an axis of the counterweight main body 10, the tooth peak height of at least some sharp teeth 15*a* of the counterweight main body 10 being different from the tooth peak height of the other sharp teeth 15*b* of the counterweight main body 10.

8. The resonance counterweight structure for audio effect article as claimed in claim 1, wherein the peripheral wall 13 of the counterweight main body 10 is formed with multiple protruding sharp teeth 15 arranged in adjacency to each other, the sharp teeth 15 extending in a direction in parallel to an axis of the counterweight main body 10, all the sharp teeth 15 of the counterweight main body 10 having different tooth peak heights.

9. The resonance counterweight structure for audio effect article as claimed in claim 2, wherein the peripheral wall 13 of the counterweight main body 10 is formed with multiple protruding sharp teeth 15 arranged in adjacency to each other, the sharp teeth 15 extending in a direction in parallel to an axis of the counterweight main body 10, all the sharp teeth 15 of the counterweight main body 10 having different tooth peak heights.

10. The resonance counterweight structure for audio effect article as claimed in claim 1, wherein the areas of the multiple perforations 16 being at least one of that the areas are equal to each other and the areas are unequal to each other.

11. The resonance counterweight structure for audio effect article as claimed in claim 2, wherein the areas of the multiple perforations 16 being at least one of that the areas are equal to each other and the areas are unequal to each other.

12. The resonance counterweight structure for audio effect article as claimed in claim 3, wherein the areas of the multiple perforations 16 being at least one of that the areas are equal to each other and the areas are unequal to each other.

13. The resonance counterweight structure for audio effect article as claimed in claim 4, wherein the areas of the multiple perforations 16 being at least one of that the areas are equal to each other and the areas are unequal to each other.

14. The resonance counterweight structure for audio effect article as claimed in claim 5, wherein the areas of the multiple perforations 16 being at least one of that the areas are equal to each other and the areas are unequal to each other.

15. The resonance counterweight structure for audio effect article as claimed in claim 6, wherein the areas of the multiple perforations 16 being at least one of that the areas are equal to each other and the areas are unequal to each other.

16. The resonance counterweight structure for audio effect article as claimed in claim 8, wherein the areas of the multiple perforations 16 being at least one of that the areas are equal to each other and the areas are unequal to each other.

17. The resonance counterweight structure for audio effect article as claimed in claim 9, wherein the areas of the multiple perforations 16 being at least one of that the areas are equal to each other and the areas are unequal to each other.

18. The resonance counterweight structure for audio effect article as claimed in claim 3, wherein the peripheral wall 13 of the counterweight main body 10 is formed with multiple protruding sharp teeth 15 arranged in adjacency to each other, the sharp teeth 15 extending in a direction in parallel to an axis of the counterweight main body 10, all the sharp teeth 15 of the counterweight main body 10 having different tooth peak heights.

* * * * *